(12) United States Patent  (10) Patent No.: US 8,177,165 B2
Bettell  (45) Date of Patent: May 15, 2012

(54) AIRCRAFT SEAT

(75) Inventor: Ray Bettell, Wimborne (GB)

(73) Assignee: Contour Aerospace Limited

( * ) Notice: Subject to any disclaimer, the term of this patent is extended or adjusted under 35 U.S.C. 154(b) by 0 days.

(21) Appl. No.: 13/166,959

(22) Filed: Jun. 23, 2011

(65) Prior Publication Data

US 2011/0253838 A1  Oct. 20, 2011

Related U.S. Application Data

(62) Division of application No. 11/719,609, filed as application No. PCT/GB2005/004400 on Nov. 15, 2005, now Pat. No. 7,997,531.

(30) Foreign Application Priority Data

Nov. 17, 2004 (GB) .................................. 0425323.3

(51) Int. Cl.
*B64D 11/06* (2006.01)
(52) U.S. Cl. ..................... 244/118.6; 244/122 R; 297/61
(58) Field of Classification Search ............... 244/118.6, 244/122 R; 297/61; D6/356, 357
See application file for complete search history.

(56) References Cited

U.S. PATENT DOCUMENTS

| 188,167 | A | | 3/1877 | Mitchell | |
|---|---|---|---|---|---|
| 1,548,334 | A | | 8/1925 | Sebell | |
| 6,059,364 | A | * | 5/2000 | Dryburgh et al. | 297/354.13 |
| 6,170,786 | B1 | * | 1/2001 | Park et al. | 248/274.1 |
| D439,063 | S | * | 3/2001 | Round et al. | D6/356 |
| D439,425 | S | * | 3/2001 | Park et al. | D6/356 |
| 6,209,956 | B1 | * | 4/2001 | Dryburgh et al. | 297/245 |
| 6,276,635 | B1 | * | 8/2001 | Ferry et al. | 244/118.6 |
| 6,398,164 | B1 | * | 6/2002 | Fasse | 244/118.6 |
| 7,318,622 | B2 | * | 1/2008 | Rezag et al. | 297/118 |
| 7,360,742 | B2 | * | 4/2008 | Beroth | 244/118.5 |
| 2001/0003962 | A1 | * | 6/2001 | Park et al. | 108/140 |
| 2002/0070314 | A1 | * | 6/2002 | Schmidt-Schaeffer | 244/118.6 |

(Continued)

FOREIGN PATENT DOCUMENTS

DE  29702660  5/1997

(Continued)

*Primary Examiner* — Tien Dinh
*Assistant Examiner* — Justin Benedik
(74) *Attorney, Agent, or Firm* — Jennifer Meredith, Esq.; Meredith & Keyhani, PLLC (57) ABSTRACT

An aircraft seat in a cubicle able to provide privacy via a hidden, sliding/pocket door drawn to a seat-side end of a divider between adjacent seats from within a facing panel of the next divider in the line of seats. The divider provides a recessed backing for the seat; whilst a return recess provides foot rest space opposite the seat. The dividers are generally S-shaped in one form. The seat in one form is a double seat, in that it comprises a convertible seat and a fixed seat immediately next to each other. The fixed seat provides an alternative seating position when the convertible seat is in bed configuration and a seat for a friend when the convertible seat is in seat configuration. In one form not only the convertible seat, but also the fixed seat have seat belts, the latter seat's belts being provided in case of turbulence during use. The convertible seat has a seat squab, a backrest and a leg rest both pivotally connected to the seat squab that are reclinable via a reclining mechanism.

13 Claims, 6 Drawing Sheets

U.S. PATENT DOCUMENTS

| | | | |
|---|---|---|---|
| 2004/0051003 A1* | 3/2004 | Cheung | 244/118.6 |
| 2004/0195451 A1* | 10/2004 | Bentley et al. | 244/118.6 |
| 2004/0232283 A1* | 11/2004 | Ferry et al. | 244/118.6 |
| 2005/0067870 A1 | 3/2005 | Rezag | |
| 2006/0086864 A1* | 4/2006 | Beroth | 244/122 R |
| 2006/0097553 A1* | 5/2006 | Spurlock et al. | 297/248 |

FOREIGN PATENT DOCUMENTS

| | | |
|---|---|---|
| FR | 2860194 A1 * | 9/2003 |
| GB | 2295962 | 6/1996 |

* cited by examiner

AIRCRAFT SEAT

RELATED APPLICATIONS

This application is a divisional application of and claims priority to U.S. patent application Ser. No. 11/719,609 filed Apr. 22, 2008 now U.S. Pat. No. 7,997,531 which claims priority of United Kingdom Serial No. 0425323.3 filed Nov. 17, 2004, and PCT/GB05/004400, filed Nov. 15, 2005, the entire contents of each of which are incorporated herein by reference.

BACKGROUND

The present invention relates to an aircraft seat convertible to a bed. For the avoidance of doubt, in this specification, the term "squab" is used to mean the upholstered portion of a seat, on which an occupant of the seat rests his/her weight.

Many proposals have been made to convert an aircraft seat into a bed. Generally these involve reclining a seat into a flat or nearly flat position. An example of such a seat is described in our prior European Patent No 1,074,468 ("Our Earlier European Patent"). It is known to go further than merely angling the three elements of a seat, namely the backrest, squab and leg rest. For instance in International Patent Application No WO 03/013903, in the name of Virgin Atlantic Airways Limited, there is a proposal to configure the seat such that the seat backrest folds forwards for conversion to a bed, with the bed portion being formed by the backrest of the seat backrest and other surfaces (see FIG. 5 of the Virgin publication). These include the folded forwards headrest, an ottoman or foot rest and a triangular area normally behind the backrest.

SUMMARY OF DISCLOSURE

The object of the present invention is to provide an improved aircraft seat convertible to a bed.

According to the invention there is provided a passenger accommodation cubicle comprising:
  a seat convertible to a bed, having a seat configuration and a bed configuration, and defining a bed-head region of the cubicle and bed-foot region thereof;
  a non-convertible seat arranged:
    beside the convertible seat, in the latter's seat configuration and
    with the bed-head region of another, in-front cubicle able to be spaced in front of the non-convertible seat, the said cubicle being adapted to overlap the in-front cubicle with its bed-foot region beside the bed-head region of the in-front cubicle,
  a cubicle divider having:
    a bed-side portion passing alongside at least alongside the bed-head region of the convertible seat opposite from the non-convertible seat to divide the said cubicle from the bed-foot region of another cubicle able to be arranged beside and behind the said cubicle and
    a bed-head portion passing behind the bed-head region of the convertible seat and behind the non-convertible seat.

In the preferred embodiment, the cubicle divider additionally has both:
  a seat side portion passing alongside the non-convertible seat opposite from the convertible seat; and
  a bed foot portion in front of the bed-foot region.

Preferably, the passenger accommodation cubicle includes a door or screen arranged to be closed or drawn from either of the seat side portion of the divider or the bed-head portion of the divider in front to the said bed-head portion or the said seat side portion. Further, the divider will usually include one or more storage compartment, at least in its bed-head portion.

Normally the convertible bed will have:
  a seat squab,
  a seat backrest and
  a leg rest, the leg rest being hinged to the front of the seat squab for adjustment between more upright angles providing less leg support and more horizontal angles providing more leg support.

In one embodiment, the seat is convertible from seat configuration to bed configuration with reclining movement of the backrest and forwards movement of the seat squab, the leg rest being hinged up with forwards movement of the seat squab. A foot-rest will usually be included -rest in the bed-foot region.

Preferably, at least part of the backrest is arranged to be pivoted forwards to over-lie the seat squab providing an at least substantially flat head-end of the bed. Conveniently a stowage for a pillow will be provided behind the pivoted part of the back rest.

In another embodiment, the convertible seat comprises:
  a seat squab,
  a seat backrest,
  a foot rest arranged spacedly from the seat squab,
  a bed portion movable between two positions:
    a first position being a use position in which it is arranged in the space between the foot rest and the seat squab and
    a second stowed position.

Preferably, a part attached to the seat squab is adapted to be partially deployed from an upright stowed position as a leg rest.

Preferably, wherein the stowed position of the movable bed portion is underneath the seat squab or underneath the foot rest.

In one alternative for this embodiment, the movable bed portion is divided into two with one part being stowable under the seat squab and another part being stowable under the foot rest.

In another alternative, the stowed position of the movable bed portion is upright, or at least substantially upright, to one side of the space. The passenger accommodation cubicle can include a bed-side shelf aligned with the bed-side portion of the cubicle divider, the movable bed portion being stowed beneath the shelf.

Conveniently, the seat squab provides the head end of the bed, i.e. a support for a bed pillow. In this case, at least part of the backrest can be arranged to be pivoted forwards to over-lie the seat squab as providing an at least substantially flat head-end of the bed. A stowage for a pillow can be provided behind the pivoted part of the backrest.

Normally the backrest and the seat squab will be arranged in a reclinable manner and provided with a leg rest lifting up with the reclining action.

According to another aspect of the invention there is provided an aircraft seat convertible to a bed comprising:
  a seat squab,
  a seat backrest,
  a foot rest arranged spacedly from the seat squab,
  a bed portion movable between two positions:
    a first position being a use position in which it is arranged in the space between the foot rest and the seat squab and
    a second stowed position.

DETAILED DESCRIPTION OF THE PREFERRED EMBODIMENTS

Referring to the drawings, the seat 1 is installed in a cubicle 2 able to provide privacy via a hidden, sliding/pocket door 18 drawn from within a seat-side end 3 of a divider 4 between adjacent seats to a facing panel 5 of the next divider 6 in a line of cubicle and their seats. The divider 4 provides a recessed backing 7 for the seat 1; whilst a return recess 8 provides foot rest space 9 opposite the seat. The dividers are generally S-shaped.

The seat 1 is a double seat, in that it comprises a convertible seat 11 and a fixed seat 12 immediately beside each other. The fixed seat provides an alternative seating position when the convertible seat is in bed configuration and a seat for a friend when the convertible seat is in seat configuration. Not only the convertible seat, but also the fixed seat have seat belts, the latter seat's belts being provided in case of turbulence during use.

The convertible seat has a seat squab 14, a backrest 15 and a leg rest 16 both pivotally connected to the seat squab. These are reclinable via a conventional mechanism—such as in Our Earlier European Patent—and no further details of the mechanism are thought necessary in this description, with the exception of what is described below. A headrest 17 is adjustable on the backrest.

Before the means by which the seat is converted to a bed is described, a number of peripheral features will be mentioned:

A wardrobe 21 is provided in the panel 5 facing the fixed seat;

A cupboard 22 and shelves 23 are provided;

A foot rest 24 or ottoman is provided in the recess 8. This can be used as an alternative seating position and as such is provided with a seat belt, in case of turbulence during use;

A luggage storage 25 is provided under the foot rest;

A wash basin 26 is provided above the foot rest;

A television screen 27 is slidable into the recess 8 from within the divider 6;

A shelf 28 extends at the side of the cubicle between the recess 8 and the convertible seat;

A meal table 29 lifts through the shelf 28 to extend above the space 30 between the seat squab 14 and the foot rest 24.

Figure 8:
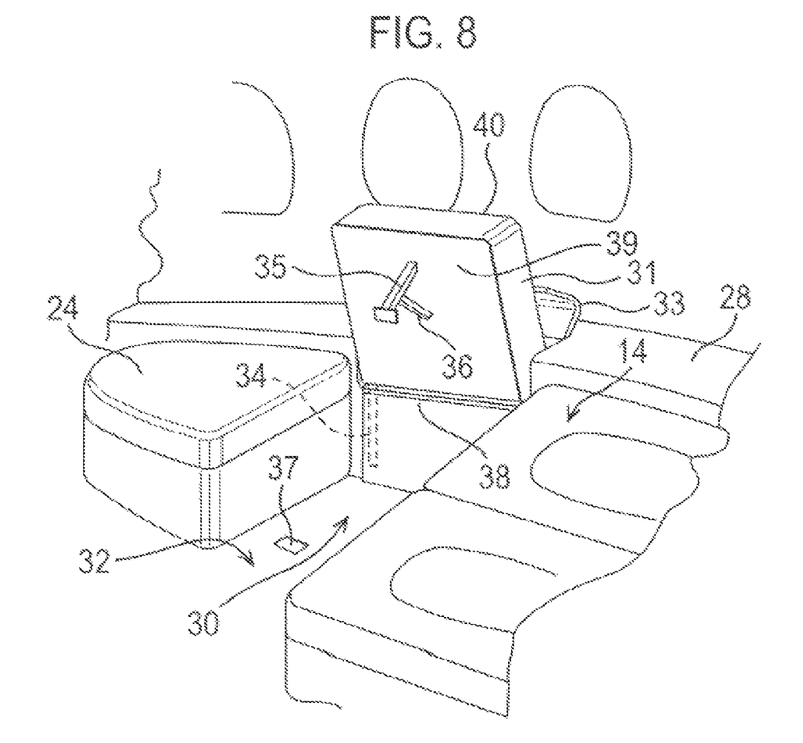
FIG. 8 is a perspective view of a bed portion of the seat being deployed, part only of the seat being shown.

As shown in FIG. 8, the seat converts to a bed having a bed-head region H and a bed-foot region F as follows:

1. A bed portion 31 is withdrawn from a stowed position, extending between the cubicle floor 32 and the shelf 28 alongside the space 30, and set up over the space 30. When not in use, the bed portion is stowed upright beneath a lid 33 in the shelf, with its lower/outer end located by pins (not shown) in tracks 34 alongside the stowed position of the bed portion. For use, the lid is opened and the bed portion is drawn up until the pins reach the top of the tracks 34. It is then swung over the space 30. A leg 35 is pivoted to the under-side of the bed portion and springs out to a strutted 36 position, in which its distal end engages with a load bearing point 37 provided in the floor of the cubicle for support of the distal end of the bed portion. The proximal end of the bed portion pivots into a position such that it is supported on a panel 38 beneath the shelf. The bed portion has a rigid base 39, of which the upper part is behind a down-turned rim 33' of the lid and the lower part is behind the panel 38, when stowed, and an upholstered top 40. This is level in bed configuration with the foot rest 24.

Figure 1:
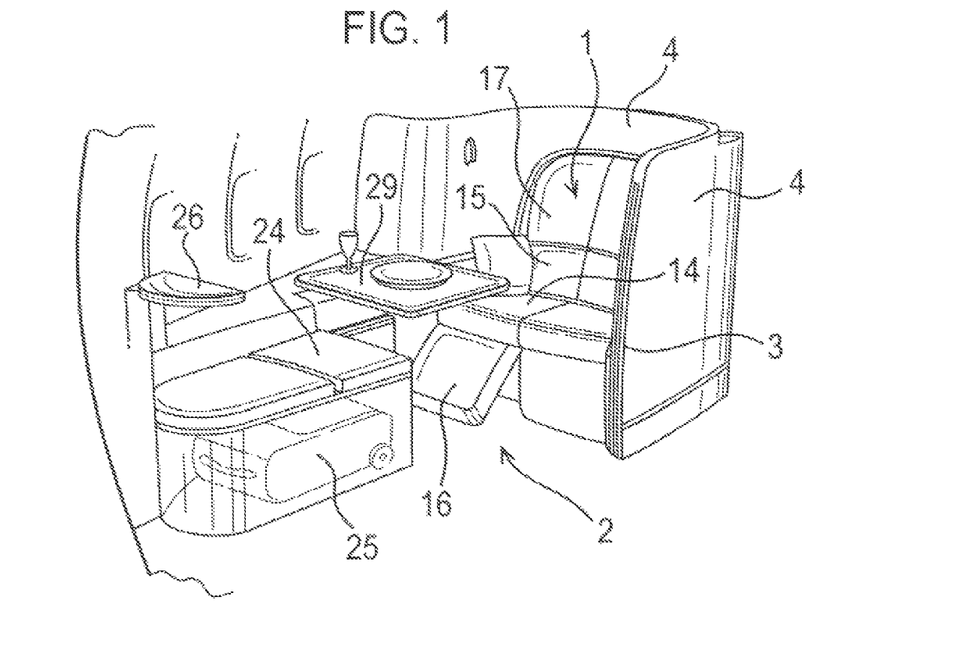
FIG. 1 shows a perspective view of a convertible seat in accordance with the invention in seat configuration.
Figure 2:
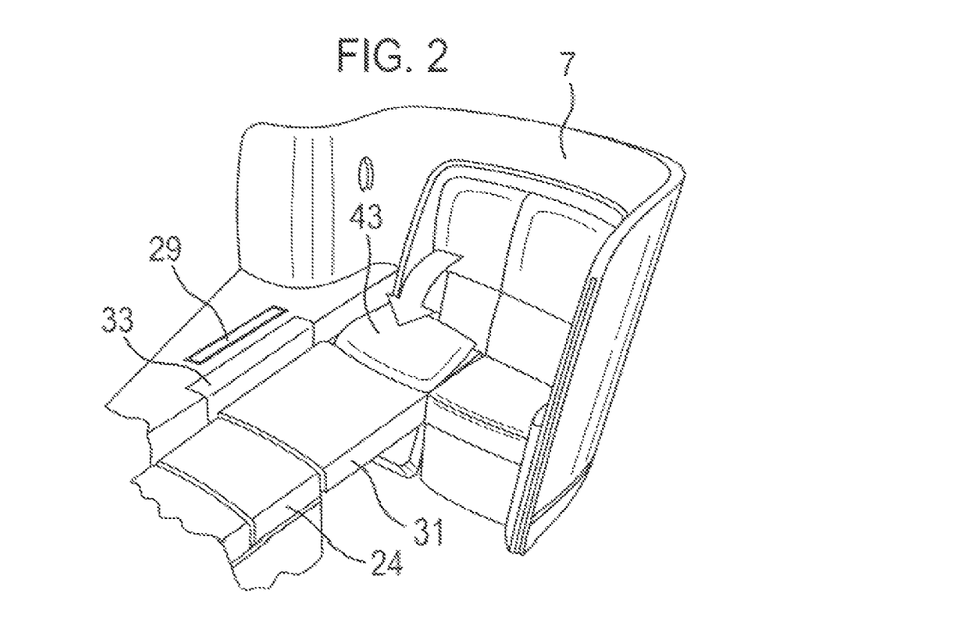
FIG. 2 shows a similar perspective view of the seat in bed configuration.
Figure 3:
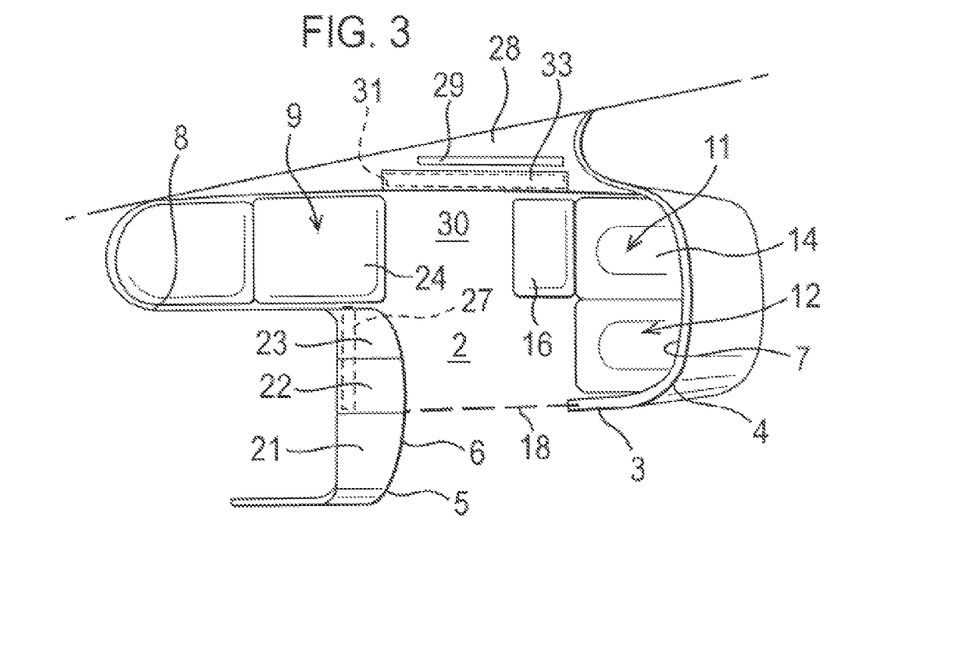
FIG. 3 is plan view of the seat in the seat configuration.
Figure 4:
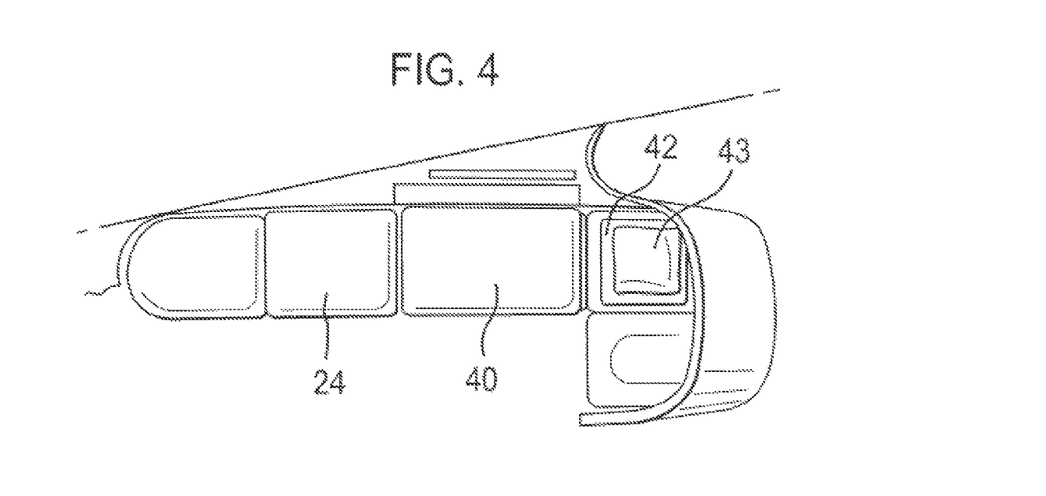
FIG. 4 is a similar, bed-configuration, plan view.
Figure 5:
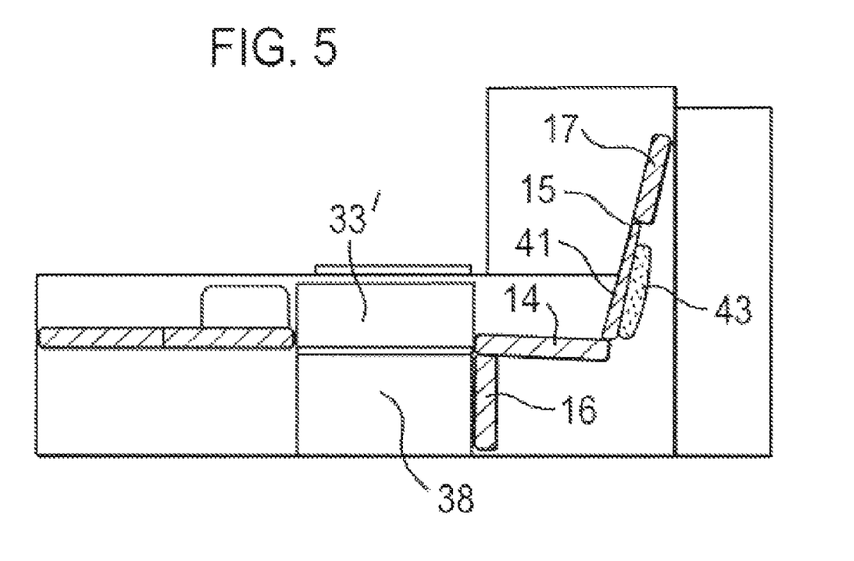
FIG. 5 is a side view of the seat in the seat configuration.
Figure 6:
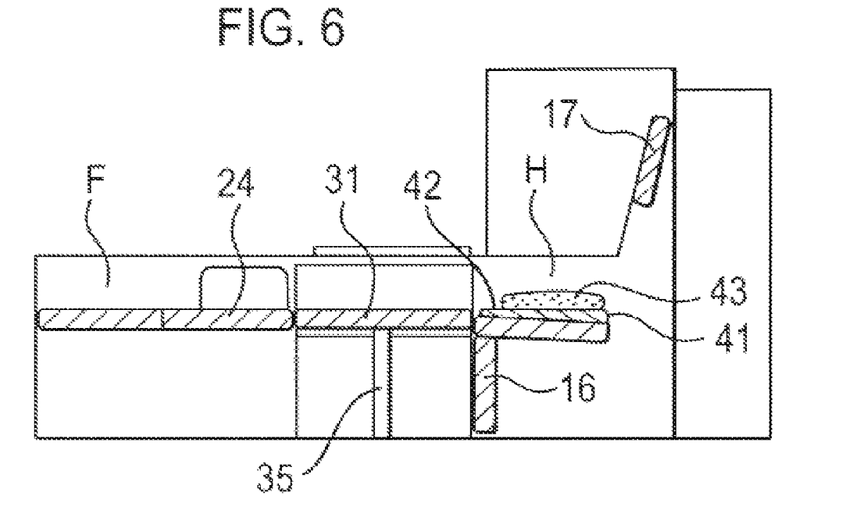
FIG. 6 is a similar, bed-configuration, side view.

2. The backrest is returned to its most upright position, if it was reclined, and a lower portion 41—see FIG. 6—of it is hinged forwards to lie on top of the seat squab. The back side 42 of this portion of the backrest, now exposed, is also upholstered and comes to be level with the top of the bed portion and the foot rest. Thus these three surfaces form a level, mattress like bed surface, no part of which is compromised as regards its lying comfort by having to perform a different, passenger support function in the seat configuration of the convertible seat. A pillow 43 is stowed behind the hingeable portion of the backrest and other bedding is stowed in the storage provided elsewhere in the cubicle.

Figure 9:
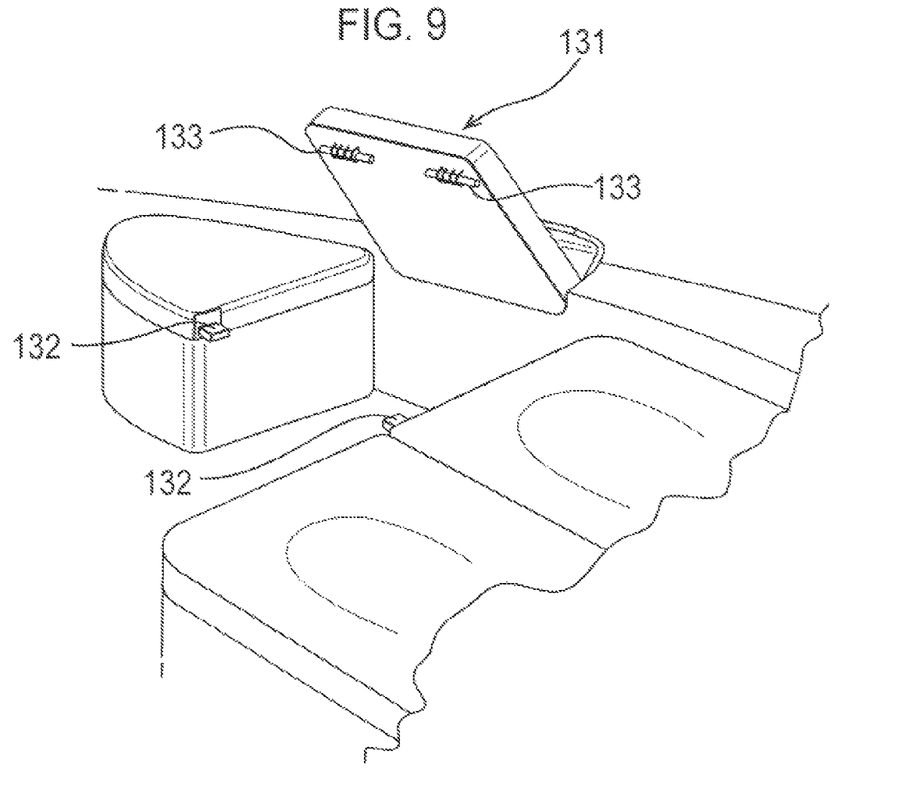
FIG. 9 is a similar view of a variant of the seat.

Turning to FIG. 9, it shows an alternative means of supporting the bed portion 131, namely via retractable abutments 132 on the seat squab and the ottoman for support of the distal corners of the bed portion. Spring loaded latches 133 are also provided for latching the bed portion in the deployed position for use or the stowed position.

Figure 10:
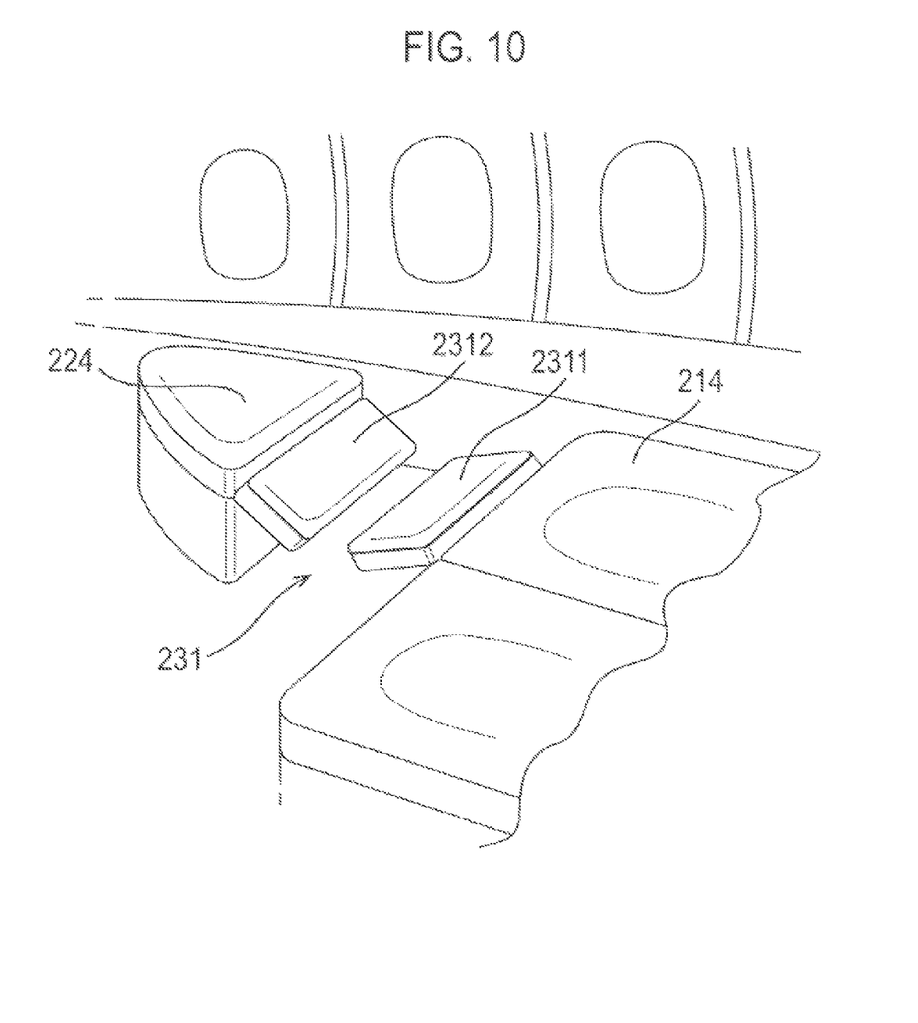
FIG. 10 is another similar view of another variant of the seat.

Further, FIG. 10 shows another alternative in which the bed section 231 is provided as two parts 2311,2312, which are hinged to the opposing edges of the seat squab 214 and the foot rest 224. These are supported by struts (not shown) which frictionally hold the bed section parts at angled positions when in use as leg rests. When the bed section parts are to be used horizontally, the struts are fully extended to engage non-return latches. The bed section parts can be stowed again by further raising of the parts to release the struts. Such latches are conventional and will not be further described.

Figure 7:
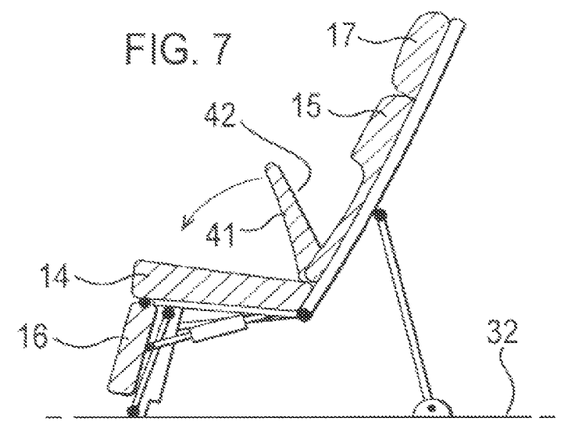
FIG. 7 is a side view of the leg rest, squab and back rest of the seat, showing a bed configuration head rest being deployed.

In a further embodiment, the seat mechanism shown in FIG. 7, is set up—as described in Our Earlier European Patent—to recline to the extent that the leg rest 16 extends horizontally to the ottoman 24, with the seat squab and seat back also extending horizontally from the bed-head region towards the bed-foot region. In this alternative no separate bed portion such as 31 is provided.

To reiterate the conversion of the seat to a bed a bed portion 31 is withdrawn from a stowed position, extending between the cabin deck 32 and a shelf 28 alongside the space 30, and set up over the space 30. When not in use, the bed portion is stowed upright beneath a lid 33 in the shelf, with its lower/outer end located by pins (not shown) in tracks 34. For use, the lid is opened and the bed portion is drawn up until the pins reach the top of the tracks 34. It is then swung over the space 30. A leg 35 is pivoted to the under-side of the bed portion and springs out to a strutted 36 position, in which its distal end engages with a load bearing point 37 provided in the floor of the cubicle for support of the distal end of the bed portion. The proximal end of the bed portion pivots into a position such that it is supported on a panel 38 beneath the shelf. The bed portion has a rigid base 39, which faces the space 30 when stowed and an upholstered top 40. This is level in bed configuration with the foot rest 24.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. An aircraft seat convertible to a bed comprising:
   a seat squab,
   a seat backrest,
   a foot rest arranged spacedly from the seat squab,
   a bed portion movable between two positions:
      a first position being a use position in the space between the foot rest and the seat squab and
      a second stowed position;
         wherein the stowed position of the movable bed portion is underneath the seat squab or underneath the foot rest; and
         wherein the bed portion movable between two positions is divided into two parts with one part being stowable under the seat squab and another part being stowable under the foot rest.

2. An aircraft seat convertible to a bed as claimed in claim 1, wherein a part stowable under the seat squab is adapted to be partially deployed from an upright stowed position as a leg rest.

3. An aircraft seat convertible to a bed as claimed in claim 1, wherein the stowed position of the movable bed portion is upright, or at least substantially upright, to one side of the space between the foot rest and the seat squab.

4. An aircraft seat convertible to a bed as claimed in claim 1, wherein the seat squab provides the head end of the bed as a support for a bed pillow.

5. An aircraft seat convertible to a bed as claimed in claim 1, wherein at least part of the backrest is arranged to be pivoted forwards to over-lie the seat squab as providing an at least substantially flat head-end of the bed.

6. An aircraft seat convertible to a bed as claimed in claim 5, including a stowage for a pillow behind the pivoted part of the backrest.

7. An aircraft seat convertible to a bed as claimed in claim 1, wherein the backrest and the seat squab are arranged in a reclinable manner and provided with a leg rest lifting up with the reclining action.

8. An aircraft seat convertible to a bed having a seat configuration and a bed configuration, the convertible seat comprising:
   a seat squab,
   a seat backrest,
   a foot rest arranged spacedly from the seat squab,
   a bed portion movable between two positions:
      a first use position in the space between the foot rest and the seat squab, wherein, when in the first use position, when the convertible seat is in the bed configuration, the bed portion provides a bed surface, in combination with the foot rest, and
      a second stowed position,
   a bed-side shelf, the movable bed portion being stowed when in its second stowed position, beneath the shelf.

9. An aircraft seat convertible to a bed as claimed in claim 8, wherein the seat squab provides the head end of the bed as a support for a bed pillow.

10. An aircraft seat convertible to a bed as claimed in claim 8, wherein at least part of the backrest is arranged to be pivoted forwards to over-lie the seat squab as providing an at least substantially flat head-end of the bed.

11. An aircraft seat convertible to a bed as claimed in claim 8, wherein the backrest and the seat squab are arranged in a reclinable manner and provided with a leg rest lifting up with the reclining action.

12. An aircraft seat convertible to a bed as claimed in claim 8, wherein the stowed position of the movable bed portion is upright, or at least substantially upright, to one side of the space between the foot rest and the seat squab.

13. An aircraft seat convertible to a bed as claimed in claim 8, bed portion provides a bed surface, in combination with the foot rest and a lower portion of the seat backrest.

* * * * *